United States Patent
Yu et al.

(10) Patent No.: US 11,284,347 B2
(45) Date of Patent: *Mar. 22, 2022

(54) ACTIVATION SYSTEM INFORMATION TRANSMISSION METHOD, APPARATUS, AND DEVICE

(71) Applicant: Huawei Technologies Co., Ltd., Shenzhen (CN)

(72) Inventors: Yinghui Yu, Beijing (CN); Lei Liu, Shanghai (CN); Nathan Edward Tenny, San Diego, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/752,304

(22) Filed: Jan. 24, 2020

(65) Prior Publication Data

US 2020/0236625 A1  Jul. 23, 2020

Related U.S. Application Data

(63) Continuation of application No. 16/035,293, filed on Jul. 13, 2018, now Pat. No. 10,595,272, which is a
(Continued)

(30) Foreign Application Priority Data

Jan. 14, 2016 (WO) ............... PCT/CN2016/070913

(51) Int. Cl.
*G08C 17/00* (2006.01)
*H04W 52/02* (2009.01)
(Continued)

(52) U.S. Cl.
CPC ....... *H04W 52/0229* (2013.01); *H04L 5/0053* (2013.01); *H04W 48/08* (2013.01);
(Continued)

(58) Field of Classification Search
None
See application file for complete search history.

(56) References Cited

U.S. PATENT DOCUMENTS

| 5,959,568 A | 9/1999 | Woolley |
| 8,478,286 B1 | 7/2013 | Fan et al. |

(Continued)

FOREIGN PATENT DOCUMENTS

| CN | 101043671 A | 9/2007 |
| CN | 101115281 A | 1/2008 |

(Continued)

OTHER PUBLICATIONS

R2-160443 Intel Corporation,"Access control parameters and mechanism," 3GPP TSG RAN WG2 NB-IOT Ad-hoc Meeting, Budapest, Hungary, total 5 pages (Jan. 19-21, 2016).
(Continued)

*Primary Examiner* — Phirin Sam
(74) *Attorney, Agent, or Firm* — Leydig, Voit & Mayer, Ltd.

(57) ABSTRACT

The present invention provides an activation system information transmission method, apparatus, and device. The method includes: receiving, by UE, a first system message sent by a base station, where the first system message includes activation indication information and a change indication tag, the activation indication information is used to indicate whether a function indicated in an activation system message is activated, and the change indication tag is used to indicate whether scheduling information of the activation system message changes; obtaining, by the UE, first scheduling information of the activation system message according to the activation indication information and the change indication tag; and reading the activation system message according to the first scheduling information, and selecting, according to the activation indication information
(Continued)

and the change indication tag, different manners to obtain the first scheduling information of the activation system message.

21 Claims, 8 Drawing Sheets

Related U.S. Application Data continuation of application No. PCT/CN2016/085476, filed on Jun. 12, 2016.

(51) Int. Cl.
    *H04W 68/00*     (2009.01)
    *H04W 76/28*     (2018.01)
    *H04L 5/00*     (2006.01)
    *H04W 48/08*     (2009.01)
    *H04W 72/12*     (2009.01)

(52) U.S. Cl.
    CPC ....... *H04W 68/00* (2013.01); *H04W 72/1289* (2013.01); *H04W 76/28* (2018.02); *Y02D 30/70* (2020.08)

(56) References Cited

U.S. PATENT DOCUMENTS

| | | | |
|---|---|---|---|
| 10,595,272 B2* | 3/2020 | Yu | H04W 48/08 |
| 2009/0042553 A1 | 2/2009 | Lavi | |
| 2010/0226389 A1 | 9/2010 | Cho et al. | |
| 2011/0002250 A1 | 1/2011 | Wang et al. | |
| 2011/0105107 A1* | 5/2011 | Kwon | H04W 28/06 455/422.1 |
| 2011/0202597 A1* | 8/2011 | Mousseau | H04W 4/00 709/203 |
| 2012/0276933 A1* | 11/2012 | Laitinen | H04W 68/025 455/458 |
| 2013/0145007 A1 | 6/2013 | Randazzo et al. | |
| 2013/0225114 A1 | 8/2013 | Kruis et al. | |
| 2013/0250758 A1* | 9/2013 | Chen | H04W 48/06 370/230 |
| 2013/0301492 A1* | 11/2013 | Ji | H04L 5/14 370/280 |
| 2014/0044093 A1 | 2/2014 | Tenny et al. | |
| 2014/0273909 A1* | 9/2014 | Ballantyne | H04W 4/90 455/404.1 |
| 2014/0348020 A1 | 11/2014 | Tenny et al. | |
| 2015/0319773 A1 | 11/2015 | Lee et al. | |
| 2016/0014628 A1 | 1/2016 | Kim | |
| 2016/0073303 A1 | 3/2016 | Damnjanovic et al. | |
| 2016/0127439 A1* | 5/2016 | Ginnela | H04L 65/4076 455/404.1 |
| 2016/0192292 A1* | 6/2016 | Hoglund | H04W 68/00 370/311 |
| 2016/0198406 A1* | 7/2016 | Hoglund | H04W 52/0206 370/311 |
| 2017/0006483 A1 | 1/2017 | Attanasio et al. | |
| 2017/0013672 A1* | 1/2017 | Islam | H04W 72/02 |
| 2017/0078995 A1* | 3/2017 | Dinan | H04W 56/0005 |
| 2018/0279403 A1* | 9/2018 | Kim | H04W 76/15 |
| 2019/0053193 A1* | 2/2019 | Park | H04L 5/0057 |

FOREIGN PATENT DOCUMENTS

| | | |
|---|---|---|
| CN | 101272601 A | 9/2008 |
| CN | 101682570 A | 3/2010 |
| CN | 102026372 A | 4/2011 |
| CN | 102123121 A | 7/2011 |
| CN | 102421138 A | 4/2012 |
| CN | 103209481 A | 7/2013 |
| CN | 104349420 A | 2/2015 |
| WO | 2015020583 A1 | 2/2015 |

OTHER PUBLICATIONS

R2-160478 Ericsson,"Access control for NB-IoT," 3GPP TSG-RAN WG2 Meeting NB-IOT ad-hoc, Budapest, Hungary, total 5 pages (Jan. 19-21, 2016).

3GPP TS 36.331 V13.0.0 3rd Generation Partnership Project; Technical Specification Group Radio Access Network; Evolved Universal Terrestrial Radio Access (E-UTRA); Radio Resource Control (RRC); Protocol specification (Release 13), total 507 pages (Dec. 2015).

U.S. Appl. No. 16/035,293, filed Jul. 13, 2018.

\* cited by examiner

US 11,284,347 B2

ACTIVATION SYSTEM INFORMATION TRANSMISSION METHOD, APPARATUS, AND DEVICE

CROSS-REFERENCE TO RELATED APPLICATIONS

This application is a continuation of U.S. patent application Ser. No. 16/035,293, filed on Jul. 13, 2018, which is a continuation of International Application No. PCT/CN2016/085476, filed on Jun. 12, 2016. The International Application claims priority to International Application No. PCT/CN2016/070913, filed on Jan. 14, 2016. All of the aforementioned patent applications are hereby incorporated by reference in their entireties.

TECHNICAL FIELD

Embodiments of the present invention relate to communications technologies, and in particular, to an activation system information transmission method, apparatus, and device.

BACKGROUND

Mobile communication has profoundly changed people's life, but people never stop pursuing higher-performance mobile communication. A $5^{th}$ Generation (5G) mobile communications system emerges, so as to deal with an explosive growth of mobile data traffic, massive device connections, and various new emerging services and application scenarios in the future. As an important part of 5G, Internet of Things witnesses a rapid growth in market demand. Currently, the $3^{rd}$ Generation Partnership Project (3GPP) is studying how to carry an Internet of Things (IoT) service based on a cellular network by designing a new air interface and making full use of a feature of a narrowband technology. This type of IoT is referred to as NB-IoT. Compared with a conventional cellular network, in an NB-IoT network, a service and a terminal device have the following requirements and features: a low service rate, a long period, massive connections, a low cost, low power consumption, and the like.

For the NB-IoT network, a system solution is re-designed in response to the foregoing requirements and features of the NB-IoT network, the service, and the terminal. A new access control mechanism is introduced in NB-IoT due to a low cost requirement. An access control parameter is placed in an independent system information block (SIB). FIG. 1 is a schematic diagram of NB-IoT access control. As shown in FIG. 1, a system message includes a master system message (Master information Block, MIB) that includes a most important system parameter of a system, a SIB 1 that carries cell access control information and scheduling information of another system information block, a SIB 2 for radio resource configuration, a newly added SIB_AC for access control, and other SIBs. When a network is lightly loaded and access control is not performed, an access control (AC) resource is not scheduled and the SIB_AC is not sent, either. When a network is overloaded and access control needs to be performed, an AC resource is scheduled and the SIB_AC needs to be sent. In this way, when an AC function is enabled or disabled, because scheduling information that is in the SIB 1 and that is corresponding to the AC function also changes, user equipment (UE) always needs to read the SIB 1 to obtain updated scheduling information when the access control function is enabled or disabled.

However, because NB-IoT supports a coverage enhancement feature and narrowband system bandwidth, and transmission time of a SIB 1 message is relatively long, the UE continuously performs detection and reception, and power consumption of the UE increases.

SUMMARY

Embodiments of the present invention provide an activation system information transmission method, apparatus, and device, so as to resolve a problem that because NB-IoT supports a coverage enhancement feature and narrowband system bandwidth, and transmission time of a SIB 1 message is relatively long, UE continuously performs detection and reception, and power consumption of the UE increases.

A first aspect of the present invention provides an activation system information transmission method, including:
receiving, by UE, a first system message sent by a base station, where the first system message includes activation indication information and a change indication tag, the activation indication information is used to indicate whether a function indicated in an activation system message is activated, and the change indication tag is used to indicate whether scheduling information of the activation system message changes;
obtaining, by the UE, first scheduling information of the activation system message according to the activation indication information and the change indication tag; and
reading, by the UE, the activation system message according to the first scheduling information.

In this solution, the UE determines, according to the activation indication information and the change indication tag in the first system message, whether to obtain the first scheduling information from the UE or obtain the first scheduling information from a system message broadcast by the base station, and after obtaining the first scheduling information, reads the activation system message at a location corresponding to the first scheduling information, and completes access to a service according to an indication in the activation system message.

With reference to the first aspect, in a first possible implementation of the first aspect, the obtaining, by the UE, first scheduling information of the activation system message according to the activation indication information and the change indication tag includes:
detecting, by the UE, whether the scheduling information of the activation system message is locally stored;
if the scheduling information of the activation system message is locally stored, determining, by the UE according to the activation indication information, whether the function indicated in the activation system message is activated;
if the function indicated in the activation system message is activated, determining, by the UE according to the change indication tag, whether the scheduling information of the activation system message changes; and
if the scheduling information of the activation system message does not change, using the locally stored scheduling information of the activation system message as the first scheduling information.

In this solution, the UE first determines whether the scheduling information of the activation system message is locally stored; if the scheduling information is locally stored, when the activation indication information indicates that the function in the activation system message is activated, the UE determines, according to the change indication tag, whether the scheduling information of the activation system message changes; and if the scheduling information of the activation system message does not change, the UE uses the locally stored scheduling information as the first scheduling information, and receives the activation system message on a resource indicated in the first scheduling information.

In this solution, if the scheduling information of the activation system message is not locally stored, the UE receives a second system message sent by the base station, where the second system message includes the first scheduling information of the activation system message and scheduling information of a conventional system message.

Optionally, if the scheduling information of the activation system message is not locally stored, and the function indicated in the activation system message is activated, the UE receives a second system message sent by the base station, where the second system message includes the first scheduling information of the activation system message and scheduling information of a conventional system message.

Optionally, if the scheduling information of the activation system message changes, the UE receives a second system message sent by the base station, where the second system message includes the first scheduling information of the activation system message and scheduling information of a conventional system message.

The foregoing solutions mean: After receiving the first system message, if the scheduling information of the activation system message is not locally stored, or the scheduling information of the activation system message is not locally stored and the function indicated in the activation system message is activated, or the scheduling information of the activation system message changes, or the scheduling information of the activation system message changes and the function indicated in the activation system message is activated, or the like, the UE further needs to obtain the scheduling information of the activation system message by receiving the second system message broadcast by the base station.

With reference to any one of the foregoing solutions, the method further includes:

updating, by the UE, the locally stored scheduling information of the activation system message to the first scheduling information. The solution means: After obtaining the first scheduling information of the activation system message, the UE needs to store the first scheduling information, and if the scheduling information is locally stored, the UE updates the scheduling information, that is, deletes the original scheduling information and updates the original scheduling information to the first scheduling information; or if the scheduling information is not locally stored, the UE directly stores the first scheduling information.

In a specific implementation, if the change indication tag is a value tag, the determining, by the UE according to the change indication tag, whether the scheduling information of the activation system message changes includes:

if the UE detects that the value tag changes, determining that the scheduling information of the activation system message changes; or if the UE detects that the value tag does not change, determining that the scheduling information of the activation system information does not change.

With reference to any one of the foregoing solutions, the activation system message includes an access control message. The access control (AC) message is used as an example. With reference to the background, the essence of this solution is to introduce a bit in a MIB to indicate whether an access control mechanism is enabled. The MIB includes a change indication tag that is used to indicate whether the scheduling information changes. In any case, the base station adds scheduling information of an SIB_AC to scheduling information of a SIB 1. When it is determined that the access control function is deactivated, the base station does not send the SIB_AC; or when it is determined that the access control function is activated, the base station sends the SIB_AC. The UE may determine, according to the change indication tag and the activation indication information in the MIB, whether to read the scheduling information of the SIB_AC sent by the base station.

A second aspect of the present invention provides an activation system information transmission method, including:

generating, by a base station, a first system message, where the first system message includes activation indication information and a change indication tag, the activation indication information is used to indicate whether a function indicated in an activation system message is activated, and the change indication tag is used to indicate whether scheduling information of the activation system message changes; and broadcasting, by the base station, the first system message, so that UE obtains first scheduling information of the activation system message according to the activation indication information and the change indication tag, and reads the activation system message according to the first scheduling information.

The base station broadcasts the first system message. The UE determines, according to the activation indication information and the change indication tag in the first system message, whether to read the scheduling information that is of the activation system message and that is sent by the base station or obtain the scheduling information of the activation system message from the UE, and then receives the activation system message at a resource location indicated in the scheduling information.

Further, the method further includes:

generating, by the base station, a second system message, where the second system message includes the scheduling information of the activation system message and scheduling information of a conventional system message; and broadcasting, by the base station, the second system message and the activation system message if the activation indication information indicates that the function indicated in the activation system message is activated; or broadcasting, by the base station, the second system message if the activation indication information indicates that the function indicated in the activation system message is not activated.

In this solution, the base station generates the second system message that includes the scheduling information of the conventional system message and the scheduling information of the activation system message, but needs to determine whether the function indicated in the activation system message is activated. If the function indicated in the activation system message is activated, the base station needs to simultaneously broadcast the second system message and the activation system message; or if the function indicated in the activation system message is not activated, the base station only needs to broadcast the second system message.

In any one of the foregoing solutions, the change indication tag is a value tag.

Specifically, the generating, by a base station, a first system message includes:

changing, by the base station, the value tag when it is determined that the sent scheduling information of the activation system message changes; or changing, by the base station, the value tag when determining that the base station changes from a state in which the base station does not send the scheduling information of the activation system message to a state in which the base station sends the scheduling information of the activation system information, or the base station changes from a state in which the base station sends the scheduling information of the activation system message to a state in which the base station does not send the scheduling information of the activation system information; or skipping, by the base station, changing the value tag when determining that the base station changes from a state in which the base station does not send the scheduling information of the activation system message to a state in which the base station sends the scheduling information of the activation system information, or the base station changes from a state in which the base station sends the scheduling information of the activation system message to a state in which the base station does not send the scheduling information of the activation system information.

This solution means: In a process of generating the first system message, the base station needs to determine the value tag. The value tag is specifically determined in the following manners. In a first manner, if the base station determines that scheduling information that is of the activation system message and that is sent last time is different from current scheduling information, that is, the scheduling information of the activation system message changes, the base station needs to change the value tag, that is, change the value tag to a value different from a last value for determining by the UE. In a second manner, if the base station determines that the scheduling information of the activation system message is not sent last time, but the scheduling information of the activation system message is sent this time, or the scheduling information of the activation system message is sent last time, but the scheduling information of the activation system message is not sent this time, the base station may change the value tag, or may not change the value tag, based on implementation of the base station.

In a specific implementation, the activation system message includes an access control message. For a specific implementation, refer to the description of a UE side.

A third aspect of the present invention provides an activation system information transmission apparatus, including:

a first receiving module, configured to receive a first system message sent by a base station, where the first system message includes activation indication information and a change indication tag, the activation indication information is used to indicate whether a function indicated in an activation system message is activated, and the change indication tag is used to indicate whether scheduling information of the activation system message changes;

a processing module, configured to obtain first scheduling information of the activation system message according to the activation indication information and the change indication tag; and a second receiving module, configured to read the activation system message according to the first scheduling information.

Further, the processing module includes:

a detection submodule, configured to detect whether the scheduling information of the activation system message is locally stored;

a first determining submodule, configured to: if the detection submodule detects that the scheduling information of the activation system message is locally stored, determine, according to the activation indication information, whether the function indicated in the activation system message is activated;

a second determining submodule, configured to: if the first determining submodule determines that the function indicated in the activation system message is activated, determine, according to the change indication tag, whether the scheduling information of the activation system message changes; and a processing submodule, configured to: if the second determining submodule determines that the scheduling information of the activation system message does not change, use the locally stored scheduling information of the activation system message as the first scheduling information.

Optionally, if the detection submodule detects that the scheduling information of the activation system message is not locally stored, the second receiving module is further configured to receive a second system message sent by the base station, where the second system message includes the first scheduling information of the activation system message and scheduling information of a conventional system message.

Optionally, if the detection submodule detects that the scheduling information of the activation system message is not locally stored, and the first determining submodule determines that the function indicated in the activation system message is activated, the second receiving module is further configured to receive a second system message sent by the base station, where the second system message includes the first scheduling information of the activation system message and scheduling information of a conventional system message.

Optionally, if the second determining submodule determines that the scheduling information of the activation system message changes, the second receiving module is further configured to receive a second system message sent by the base station, where the second system message includes the first scheduling information of the activation system message and scheduling information of a conventional system message.

Further, the apparatus further includes:

a storage module, configured to update the locally stored scheduling information of the activation system message to the first scheduling information.

Optionally, if the change indication tag is a value tag, the second determining submodule is specifically configured to: if the UE detects that the value tag changes, determine that the scheduling information of the activation system message changes; or if the UE detects that the value tag does not change, determine that the scheduling information of the activation system information does not change.

Optionally, the activation system message read by the second receiving module includes an access control message.

A fourth aspect of the present invention provides an activation system information transmission apparatus, including:

a first processing module, configured to generate a first system message, where the first system message includes activation indication information and a change indication tag, the activation indication information is used to indicate whether a function indicated in an activation system message is activated, and the change indication tag is used to indicate whether scheduling information of the activation system message changes; and a first sending module, configured to broadcast the first system message, so that user equipment UE obtains first scheduling information of the activation system message according to the activation indication information and the change indication tag, and reads the activation system message according to the first scheduling information.

Further, the apparatus further includes:

a second processing module, configured to generate a second system message, where the second system message includes the scheduling information corresponding to the activation system message and scheduling information of a conventional system message; and a second sending module, configured to broadcast the second system message and the activation system message if the activation indication information indicates that the function indicated in the activation system message is activated, where the second sending module is further configured to broadcast the second system message if the activation indication information indicates that the function indicated in the activation system message is not activated.

Optionally, if the change indication tag is a value tag, the first processing module is specifically configured to:

change the value tag when it is determined that the sent scheduling information of the activation system message changes; or change the value tag when it is determined that the access control apparatus changes from a state in which the access control apparatus does not send the scheduling information of the activation system message to a state in which the access control apparatus sends the scheduling information of the activation system information, or the access control apparatus changes from a state in which the access control apparatus sends the scheduling information of the activation system message to a state in which the access control apparatus does not send the scheduling information of the activation system information; or skip changing the value tag when it is determined that the access control apparatus changes from a state in which the access control apparatus does not send the scheduling information of the activation system message to a state in which the access control apparatus sends the scheduling information of the activation system information, or the access control apparatus changes from a state in which the access control apparatus sends the scheduling information of the activation system message to a state in which the access control apparatus does not send the scheduling information of the activation system information.

A fifth aspect of the present invention provides user equipment, including a memory that stores a program instruction, a processor configured to control execution of the program instruction, and a receiver, where the receiver is configured to receive a first system message sent by a base station, where the first system message includes activation indication information and a change indication tag, the activation indication information is used to indicate whether a function indicated in an activation system message is activated, and the change indication tag is used to indicate whether scheduling information of the activation system message changes;

the processor is configured to obtain first scheduling information of the activation system message according to the activation indication information and the change indication tag; and the receiver is further configured to read the activation system message according to the first scheduling information.

A sixth aspect of the present invention provides a base station, including a memory that stores a program instruction, a processor configured to control execution of the program instruction, and a transmitter, where the processor is configured to generate a first system message, where the first system message includes activation indication information and a change indication tag, the activation indication information is used to indicate whether a function indicated in an activation system message is activated, and the change indication tag is used to indicate whether scheduling information of the activation system message changes; and the transmitter is configured to broadcast the first system message, so that UE obtains first scheduling information of the activation system message according to the activation indication information and the change indication tag, and reads the activation system message according to the first scheduling information.

A seventh aspect of the present invention provides an access control system, including a base station and at least one UE. The base station is configured to:

generate a first system message, where the first system message includes activation indication information and a change indication tag, the activation indication information is used to indicate whether a function indicated in an activation system message is activated, and the change indication tag is used to indicate whether scheduling information of the activation system message changes; and broadcast the first system message, so that the UE obtains first scheduling information of the activation system message according to the activation indication information and the change indication tag, and reads the activation system message according to the first scheduling information.

Each UE is configured to:

receive the first system message sent by the base station, where the first system message includes the activation indication information and the change indication tag, the activation indication information is used to indicate whether the function indicated in the activation system message is activated, and the change indication tag is used to indicate whether the scheduling information of the activation system message changes; obtain the first scheduling information of the activation system message according to the activation indication information and the change indication tag; and read the activation system message according to the first scheduling information.

According to the activation system information transmission method, apparatus, and device provided in the present invention, the base station adds the activation indication information and the change indication tag to the broadcast first system message; and after receiving the first system message, the UE selects, according to the activation indication information and the change indication tag, different manners to obtain the first scheduling information of the activation system message, and then reads the activation system message at a location corresponding to the first scheduling information, so as to ensure that the UE needs to receive the scheduling information of the activation system message only when the scheduling information changes, and prevent the UE from continuously remaining in a detection and reception state, thereby effectively reducing power consumption of the UE.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 2:
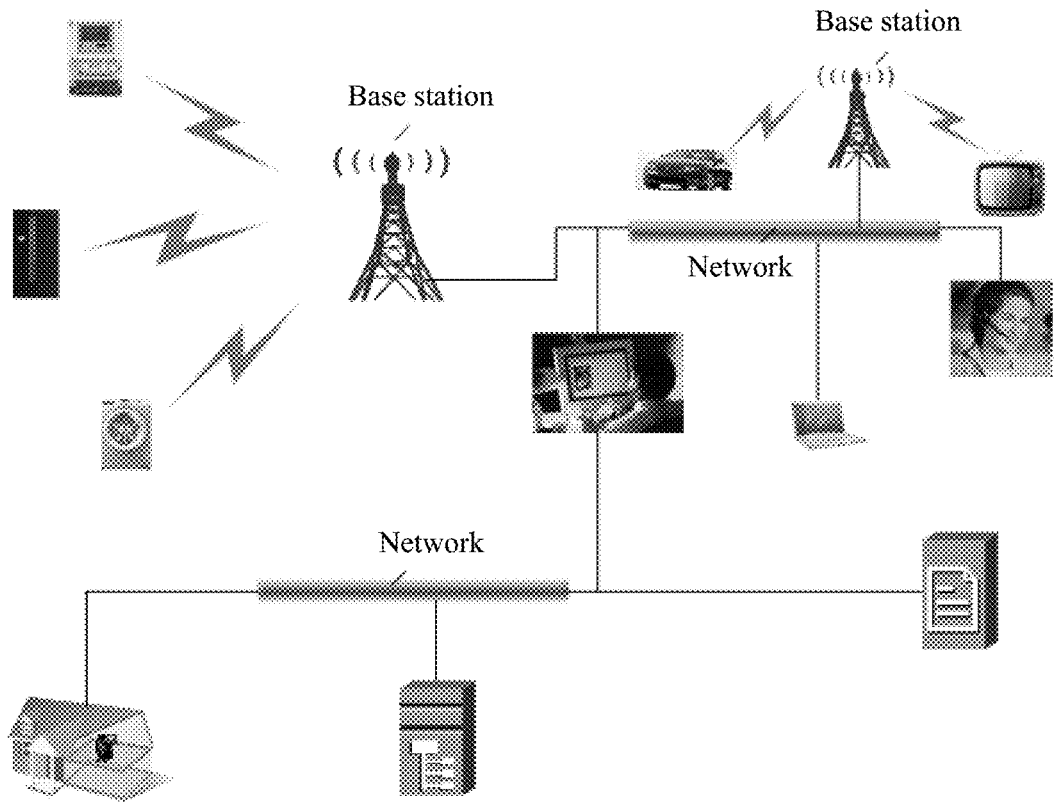
FIG. 2 is a schematic diagram of an application scenario of an activation system information transmission method according to the present invention.

FIG. 2 is a schematic diagram of an application scenario of an activation system information transmission method according to the present invention. A solution of the present invention may be applied to a wireless communications system with large network coverage and a plurality of connections, for example, an IoT communications system, shown in FIG. 2, having a terminal of low costs and low power consumption. The application scenario or the wireless communications system may include a plurality of base stations, and a coverage area of each base station may include a plurality of user equipments, such as a refrigerator, a washing machine, a car, a television, a computer, a water meter, and an electricity meter. The user equipments implement communication by using a wireless network or a cellular network. A service of the IoT communications system generates a relatively small packet and is less sensitive to a delay, so that massive user terminal devices can be deployed. The user terminal devices may include smart water/electricity meters, smart home devices, smart wearable devices, and the like that are deployed in a large scale. A large quantity of such devices may be connected to one base station. However, such a network deployment requires lower power consumption of the user equipment or the terminal device, so as to ensure an extra-long standby time of the user equipment, thereby reducing labor costs. However, in an existing control mechanism of service functions corresponding to some activation system information, power consumption of user equipment increases because updated scheduling information in a SIB 1 needs to be continuously read in a method for obtaining activation system information. In view of this, a more energy-saving activation system information transmission method is provided.

In the following technical solution, system messages are classified into two types according to a requirement for timeliness in which a changed system message needs to be obtained: One type is a conventional system message. After this type of system message changes, UE does not need to immediately obtain a changed system message, and can wait until a boundary of a change period to obtain the changed system message. The other type is an activation system message that needs to be obtained in time. After this type of system message changes, the UE can obtain an updated system message at any time, and no specific change period is used.

Figure 3:
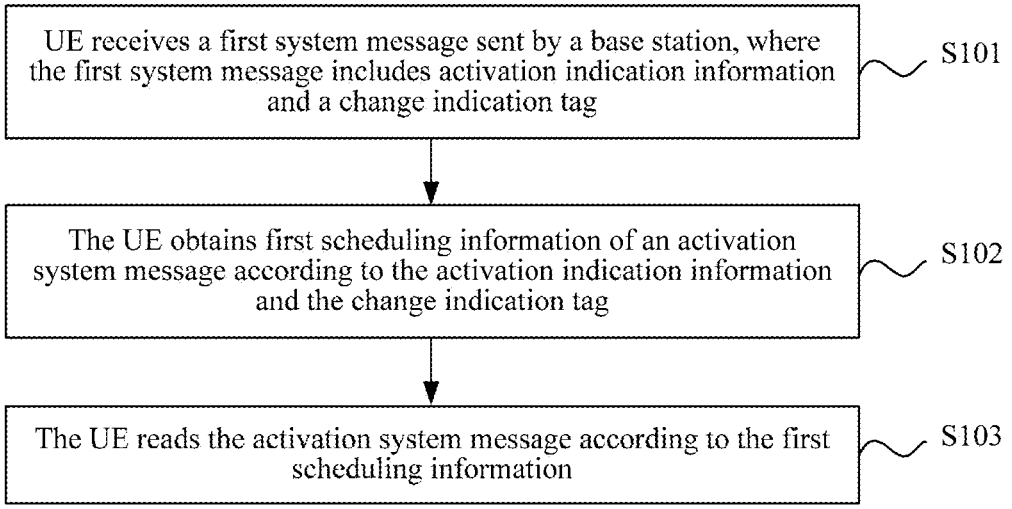
FIG. 3 is a flowchart of Embodiment 1 of an activation system information transmission method according to the present invention.

FIG. 3 is a flowchart of Embodiment 1 of an activation system information transmission method according to the present invention. As shown in FIG. 3, the solution is executed by UE on the basis of the application scenario shown in FIG. 2. The activation system information transmission method includes the following specific steps.

S101. The UE receives a first system message sent by a base station, where the first system message includes activation indication information and a change indication tag.

In this embodiment, the user equipment, that is, a terminal device on a user side, receives the first system message broadcast by the base station. The first system message is a system message necessary for transmission. The activation indication information is used to indicate whether a function indicated in an activation system message is activated, and the change indication tag is used to indicate whether scheduling information of the activation system message changes.

S102. The UE obtains first scheduling information of an activation system message according to the activation indication information and the change indication tag.

In this step, the UE does not receive all messages broadcast by the base station. In particular, for the scheduling information of the activation system message, the UE performs determining according to the activation indication information and the change indication tag. If the scheduling information of the activation system message is locally stored, and the change indication tag indicates that the scheduling information of the activation system message does not change, the UE directly uses the local scheduling information as the first scheduling information; or if the scheduling information of the activation system message is not locally stored, the UE receives the scheduling information from the messages broadcast by the base station.

S103. The UE reads the activation system message according to the first scheduling information.

In this step, after obtaining the first scheduling information, the UE needs to receive the activation system message on a resource (or referred to as a location) indicated in the first scheduling information.

The terminal uses a corresponding activation function according to a function supported in the activation system message.

Access control is used as an example. After reading a message in which an access control message is located, the terminal determines, according to an access control parameter included in the message, whether to access a network.

According to the activation system information transmission method provided in this embodiment, the base station adds the activation indication information and the change indication tag to the broadcast first system message; and after receiving the first system message, the UE selects, according to the activation indication information and the change indication tag, different manners to obtain the first scheduling information of the activation system message, and then reads the activation system message at a location corresponding to the first scheduling information, so as to ensure that the UE needs to receive the scheduling information of the activation system message only when the scheduling information changes, and prevent the UE from continuously remaining in a detection and reception state, thereby effectively reducing power consumption of the UE.

On the basis of the foregoing embodiment, the following describes in detail a specific implementation in which the UE obtains the first scheduling information.

Figure 4:
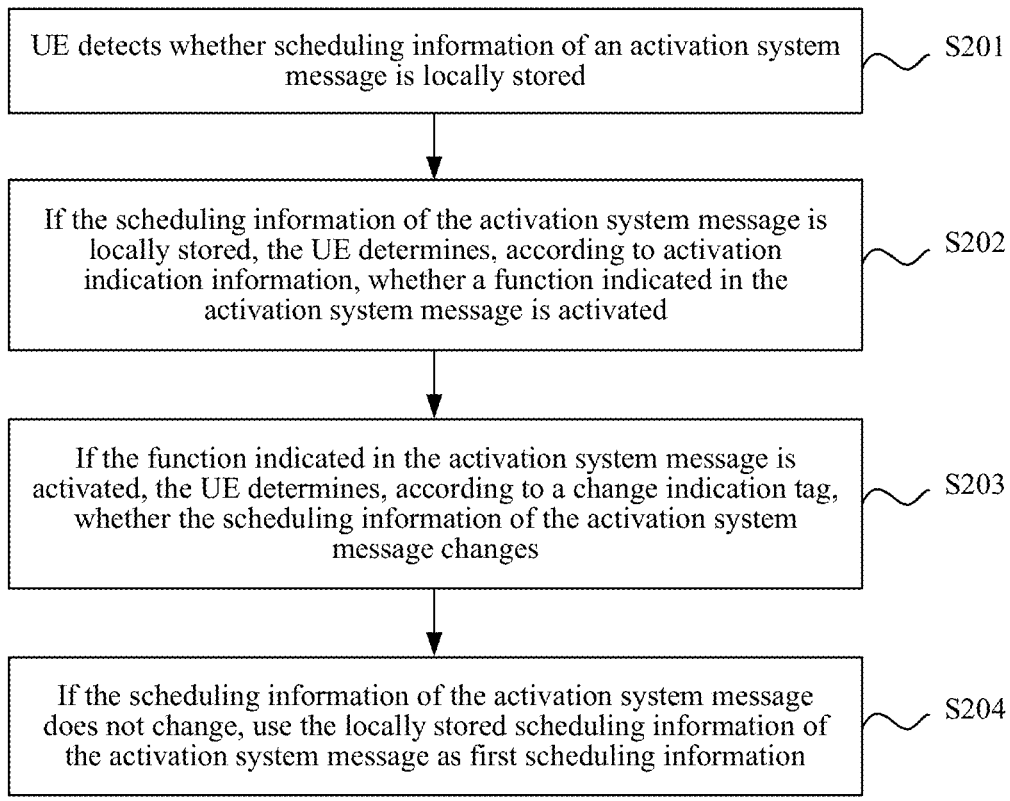
FIG. 4 is a flowchart of Embodiment 2 of an activation system information transmission method according to the present invention.

FIG. 4 is a flowchart of Embodiment 2 of an activation system information transmission method according to the present invention. As shown in FIG. 4, on the basis of the foregoing embodiment, a specific implementation step in which the UE obtains the first scheduling information of the activation system message according to the activation indication information and the change indication tag in S102 is as follows:

S201. The UE detects whether scheduling information of the activation system message is locally stored.

In this step, after receiving the first system message, the UE first needs to detect whether scheduling information of one or more corresponding activation system messages is locally stored, that is, each time obtaining the scheduling information, the UE needs to store the scheduling information.

Optionally, if the UE detects that the scheduling information of the activation system message is not locally stored, the UE receives a second system message sent by the base station, where the second system message includes the first scheduling information of the activation system message and scheduling information of a conventional system message. This means: After the UE detects that the scheduling information of the activation system message is not locally stored, the UE needs to obtain the scheduling information from the second system message broadcast by the base station, that is, read the scheduling information from a scheduling information block.

S202. If the scheduling information of the activation system message is locally stored, the UE determines, according to the activation indication information, whether a function indicated in the activation system message is activated.

In this step, if the UE stores the scheduling information of the activation system message, the UE needs to detect whether the function indicated in the activation system information is activated; and if the function indicated in the activation system information is activated, the UE needs to obtain the scheduling information.

S203. If the function indicated in the activation system message is activated, the UE determines, according to the change indication tag, whether the scheduling information of the activation system message changes.

In this step, if the UE determines that the function indicated in the activation system message is activated, and has determined, according to the foregoing step, that the scheduling information of the activation system message is locally stored, the UE needs to further determine whether the scheduling information of the activation system message changes. In a specific implementation, the change indication tag may be a value tag, that is, a value is used to indicate a change of the scheduling information. A specific manner of determining whether the scheduling information changes is: If the UE detects that the value tag changes, the UE determines that the scheduling information of the activation system message changes; or if the UE detects that the value tag does not change, the UE determines that the scheduling information of the activation system information does not change. That is, the UE detects whether a current value tag is the same as a value tag obtained last time; and if the current value tag is the same as the value tag obtained last time, the UE determines that the scheduling information of the activation system message does not change, or if the current value tag is different from the value tag obtained last time, the UE determines that the scheduling information of the activation system message changes.

The foregoing description means: If the change indication tag does not change, the UE determines that the scheduling information of the activation function does not change; or if the change indication tag changes, the UE determines that the scheduling information of the activation function changes.

Optionally, the determining that the scheduling information of the activation system message does not change includes at least the following two cases. In a first case, if the change indication tag indicates that the scheduling information of the activation system message does not change, and the second system message does not include the scheduling information of the activation system message, the UE determines that the scheduling information of the activation function does not change. In a second case, if the change indication tag indicates that the scheduling information of the activation system message does not change, and the second system message includes the scheduling information of the activation system message, the UE determines that the scheduling information of the activation function does not change.

Optionally, in the foregoing process, if the scheduling information of the activation system message is not locally stored, and the function indicated in the activation system message is activated, the UE receives a second system message sent by the base station, where the second system message includes the first scheduling information of the activation system message and scheduling information of a conventional system message.

That is, in the process, if the UE detects that the scheduling information of the activation system message is not locally stored, and the activation indication information indicates that the function indicated in the activation system message is activated, the UE needs to read the scheduling information of the corresponding activation system message from the second system message broadcast by the base station and use the scheduling information as the first scheduling information, so as to obtain the scheduling information of the corresponding activation system message.

S204. If the scheduling information of the activation system message does not change, use the locally stored scheduling information of the activation system message as the first scheduling information.

This step means: When the UE determines that the activation system message is locally stored, the function indicated in the activation system message is activated, and the scheduling information of the activation system message does not change, the UE does not need to read the second system message broadcast by the base station, and directly uses the locally stored scheduling information as the first scheduling information.

Optionally, if the scheduling information of the activation system message changes, the UE receives a second system message sent by the base station, where the second system message includes the first scheduling information of the activation system message and scheduling information of a conventional system message.

However, if the UE determines, by using the value tag, that the scheduling information of the activation system message changes, the UE needs to obtain the first scheduling information by means of reading from the second system message.

Further, after obtaining the first scheduling information, the UE updates the locally stored scheduling information of the activation system message to the first scheduling information. That is, if the scheduling information of the activation system message changes, the UE deletes the locally stored scheduling information and updates the scheduling information to new scheduling information; or if the scheduling information of the activation system message does not change, the UE does not need to update the scheduling information. In addition, if the scheduling information is not locally stored, the UE needs to store the first scheduling information after obtaining the first scheduling information.

In the foregoing process, to monitor a change of the value tag, the UE needs to locally store a corresponding value tag after each time of processing is completed, so as to make a comparison in a next time of detection.

Optionally, the activation system message includes an access control message.

According to the activation system information transmission method provided in this embodiment, the UE determines, according to the activation indication information and the change indication tag in the first system message, whether the function in the activation system information is activated, and determines whether the scheduling information of the activation system information changes; and when the scheduling information of the activation system information is locally stored, the corresponding function is activated, and the scheduling information does not change, the UE does not need to receive the scheduling information from the base station, but uses the locally stored scheduling information as the first scheduling information of the activation system information, and reads the corresponding activation system information according to the first scheduling information, so as to complete a subsequent service, and reduce duration for which the terminal is in a detection and reception state, thereby reducing power consumption of the UE.

Figure 5:
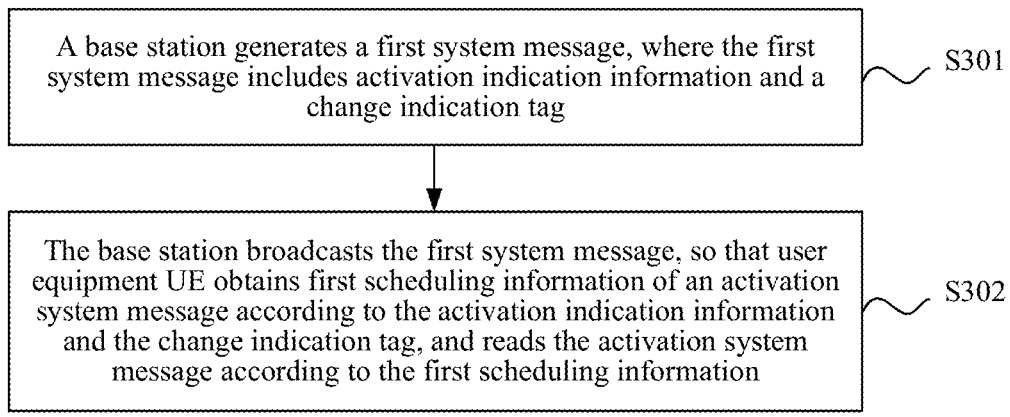
FIG. 5 is a flowchart of Embodiment 3 of an activation system information transmission method according to the present invention.

FIG. 5 is a flowchart of Embodiment 3 of an activation system information transmission method according to the present invention. As shown in FIG. 5, the solution is executed by a base station in the scenario shown in FIG. 2.

A specific implementation step of the activation system information transmission method is as follows:

S301. The base station generates a first system message, where the first system message includes activation indication information and a change indication tag.

In this embodiment, the activation indication information is used to indicate whether a function indicated in an activation system message is activated, and the change indication tag is used to indicate whether scheduling information of the activation system message changes.

S302. The base station broadcasts the first system message, so that user equipment UE obtains first scheduling information of an activation system message according to the activation indication information and the change indication tag, and reads the activation system message according to the first scheduling information.

In this embodiment, the base station adds the change indication tag to the first system message, so that the UE determines whether the scheduling information of the activation system information changes. If the scheduling information of the activation system information does not change, the function in the activation system message is activated, and the UE stores previous scheduling information of the activation system message, the UE may directly use the scheduling information as the first scheduling information to read the activation system message, and the UE does not need to read a second system message.

For a base station side, the second system message needs to be generated regardless of whether the function in the foregoing activation system message is activated.

Further, the base station generates the second system message, where the second system message includes the scheduling information corresponding to the activation system message and scheduling information of a conventional system message.

The base station broadcasts the second system message and the activation system message if the activation indication information indicates that the function indicated in the activation system message is activated; or the base station broadcasts the second system message if the activation indication information indicates that the function indicated in the activation system message is not activated.

The broadcasting the second system message means: If the function in the activation system message is activated, the base station needs to broadcast the second system message and the activation system message; or if the function in the activation system message is not activated, the base station only needs to broadcast the second system message, and does not need to broadcast the activation system message.

In a specific implementation, the change indication tag is a value tag.

That the base station generates a first system message includes:

changing, by the base station, the value tag when it is determined that the sent scheduling information of the activation system message changes; or changing, by the base station, the value tag when determining that the base station changes from a state in which the base station does not send the scheduling information of the activation system message to a state in which the base station sends the scheduling information of the activation system information, or the base station changes from a state in which the base station sends the scheduling information of the activation system message to a state in which the base station does not send the scheduling information of the activation system information; or skipping, by the base station, changing the value tag when determining that the base station changes from a state in which the base station does not send the scheduling information of the activation system message to a state in which the base station sends the scheduling information of the activation system information, or the base station changes from a state in which the base station sends the scheduling information of the activation system message to a state in which the base station does not send the scheduling information of the activation system information.

The solution for changing the value tag in the first system message, that is, the solution of changing the change indication tag means: If the base station determines that current scheduling information of the activation system message is different from previous scheduling information of the activation system message, the base station changes the value tag, so that the UE can determine that the scheduling information has changed after receiving a changed value tag. If the base station determines that the scheduling information of the activation system message is not sent last time, but the scheduling information of the activation system message is sent in this time of scheduling, or the scheduling information of the activation system message is sent in a last time of scheduling, but the scheduling information of the activation system message is not sent this time, that is, when a behavior of sending or not sending the scheduling information changes, the base station may change the value tag, or may not change the value tag.

That is, if the base station sends the scheduling information of the activation system message by using the second system message, and if the scheduling information changes, the base station changes the change indication tag; or if whether the base station adds the scheduling information of the activation system message to the second system message changes, the base station changes the change indication tag; or if whether the base station adds the scheduling information of the activation system message to the second system message changes, the base station does not change the change indication tag. That whether the base station adds the scheduling information of the activation system message to the second system message changes specifically includes: That the second system message of the base station previously includes the scheduling information of the activation system message changes to that the second system message of the base station currently does not include the scheduling information of the activation system message; or that the second system message of the base station previously does not include the scheduling information of the activation system message changes to that the second system message of the base station currently includes the scheduling information of the activation system message.

Optionally, the activation system message includes an access control message.

Based on the application scenario shown in FIG. 2, for an NB-IoT system, the following uses an access control message as an example to describe in detail the activation system information transmission method (equivalent to an access control method in this solution) in the present invention. Network elements deployed in the solution are a base station and user equipment, and a main idea of the solution is as follows:

1. A bit (that is, the foregoing activation indication information) is introduced in a master system message (Master information Block, MIB) to indicate whether an NB-IoT access control mechanism is enabled. In addition, the MIB further includes a value tag (that is, the change indication tag) that is used to indicate change indications of a plurality of SIBs that affect a change of the value tag other than the MIB.

2. Regardless of whether an NB-IoT access control function is enabled, the base station adds scheduling information of an SIB_AC to scheduling information of a SIB 1. A change of the scheduling information affects a value of the value tag in the MIB, that is, the base station always schedules SIB_AC system message.

Specifically, when the access control function is deactivated (AC=OFF), the SIB_AC system message is not sent, and a radio resource corresponding to the SIB_AC system message may be used for other data transmission. When the access control function is activated (AC=ON), the SIB_AC system message is sent.

3. For the UE, the UE determines whether to read scheduling information of the SIB_AC system message and the SIB_AC system message according to the value of the value tag in the MIB and the bit that is in the MIB and that indicates whether access control is activated.

Optionally, another method is: Similar to that in existing LTE, broadcasting the SIB_AC or not makes the scheduling information of the SIB 1 change. However, the value tag in the MIB may not change. An eNB determines, according to a broadcast period, an occupied resource, and the like of the SIB_AC, whether the value tag needs to be updated. If none of the information changes, and only the SIB_AC broadcasting starts and stops, the eNB may not change the value tag.

In the solution of the present invention, system messages are classified into two types according to a requirement for timeliness in which a changed system message needs to be obtained: One type is a conventional system message. After this type of system message changes, UE does not need to immediately obtain a changed system message, and can wait until a boundary of a change period to obtain the changed system message. The other type is an activation system message that needs to be obtained in time. After this type of system message changes, the UE can obtain an updated system message at any time, and no specific change period is used.

Whether the conventional system message changes may be indicated by a value tag. Values of value tags are compared to determine whether the system message changes. Each value tag represents a version of the conventional system message. When the value tag changes, it means that some conventional system messages change. The value tag is used to indicate a change status of a system information block after a system message in which the value tag is located. For example, if the value tag is located in a MIB, the value tag is used to indicate changes of all conventional SIBs other than the MIB. The SIBs include a SIB 1, a SIB 2, SIBs 3, 4, and 5, and the like (a SIB that carries cell access control information and scheduling information of another system information block is represented as the SIB 1, a SIB for radio resource configuration is represented as the SIB 2, a SIB newly added to a cell for access control is represented as an SIB_AC, and SIBs for cell selection and re-selection configuration are represented as the SIBs 3, 4, and 5).

A system message that needs to be obtained in time is not enumerated, and further includes another possible system message that needs to be obtained in time, for example, an SIB_AC in which an access control parameter is located. After the access control parameter changes, the UE can obtain a changed access control parameter in time without waiting until a boundary of a change period to obtain the changed access control parameter.

In addition, for reducing power consumption of the terminal, an indication is introduced in the MIB to indicate whether an access control function is enabled, or whether another system information block that needs to be obtained in time is enabled. An access control information block is used as an example herein to describe a method for sending and obtaining scheduling information of the system information block that needs to be obtained in time. A method for obtaining a scheduling mechanism of the another system information block that needs to be obtained in time is the same as the method for obtaining scheduling information of the access control information block, and is not described.

Figure 6:
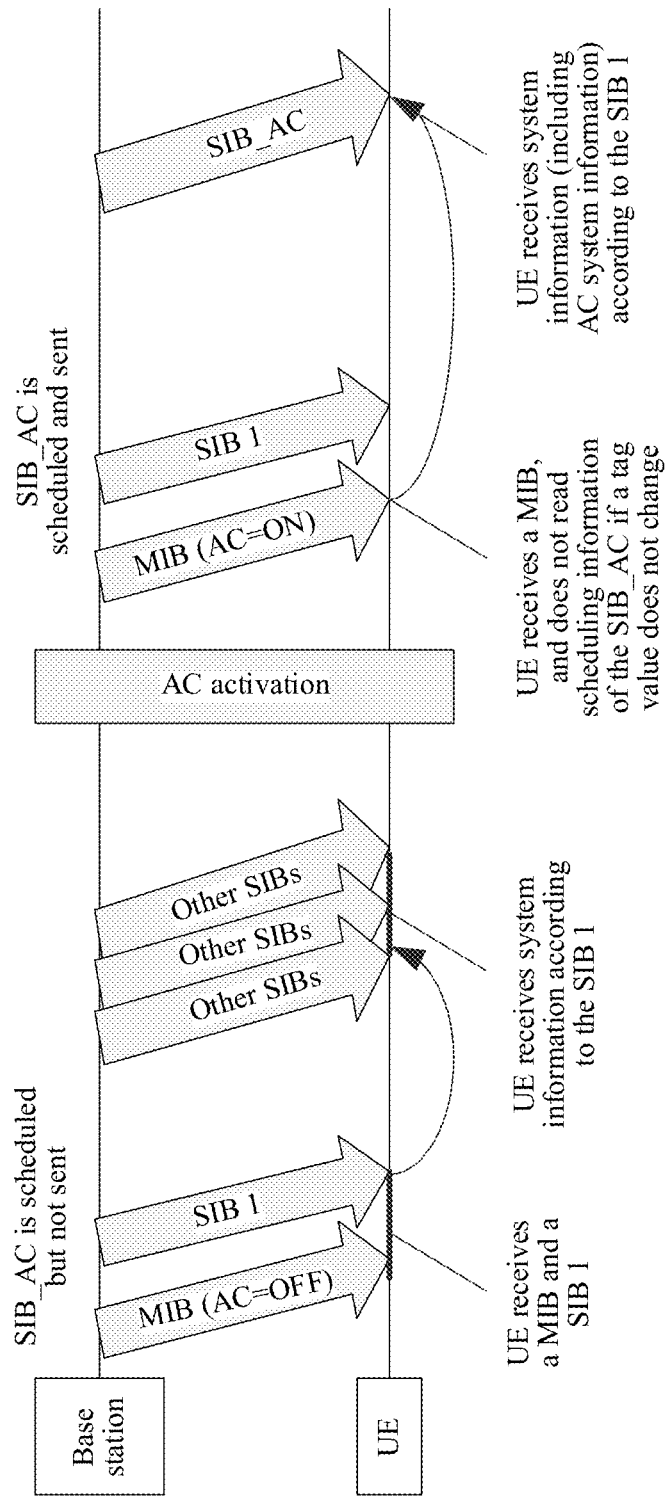
FIG. 6 is a schematic diagram of NB-IoT access control according to the present invention.

With reference to the essence of the solution described above, FIG. 6 is a schematic diagram of NB-IoT access control according to the present invention. As shown in FIG. 6, a base station first sends an access control enabling indication (which is equivalent to activation indication information and is used in the solution to indicate whether access control is activated) by using a MIB.

The base station schedules access control, and sends scheduling information of an SIB_AC (an access control information block) by using scheduling information of a SIB 1.

On a UE side, when UE reads a system message, the UE first reads a value tag (equivalent to the foregoing change indication tag) and the access control enabling indication in the MIB. If the access control enabling indication indicates that an access control function is enabled, the UE detects whether a SIB 1 that includes scheduling information of an access control parameter is locally stored.

If the UE detects that the scheduling information of the access control parameter is not locally stored, the UE reads the SIB 1 sent by the base station to obtain the scheduling information of the access control parameter SIB_AC, and then obtains an SIB_AC in which the access control parameter is located and that is sent at a resource location indicated in the scheduling information. That is, when the scheduling information of the SIB_AC is not locally stored, the UE needs to read the scheduling information that is of the SIB_AC and that is in the SIB 1 broadcast by the base station, and receive, on a corresponding resource, the SIB_AC in which the access control parameter is located.

If the UE detects that the scheduling information of the access control parameter is locally stored, the UE compares a current value tag with a previously stored value tag. If values of the value tags are the same, the UE uses previously stored scheduling information of the access control parameter SIB_AC to read an SIB_AC in which the access control parameter is located without reading the SIB 1 in which the scheduling information of the access control parameter is located and that is broadcast by the base station. If values of the value tags are different, the UE reads scheduling information that is of the access control parameter SIB_AC and that is updated in the SIB 1, and then locally stores or updates the scheduling information of the access control parameter, and reads an access control parameter SIB_AC transmitted at a resource location indicated in the scheduling information.

In the foregoing solution, when the UE reads the system message, the UE first reads the value tag and the access control enabling indication in the MIB. If the access control enabling indication indicates that the access control function is disabled, that is, the access control function is not activated, the UE may read the scheduling information of the access control parameter in the SIB 1 and store the scheduling information in the UE, or may not directly read the scheduling information in the SIB 1.

In the foregoing solution, it can be ensured that the user equipment needs to obtain the scheduling information of the access control parameter only when the scheduling information related to the access control parameter changes and the access control function is enabled, so as to reduce power consumption of the UE. Compared with the prior art in which the user equipment needs to always serve the SIB 1 to obtain the scheduling information of the access control parameter, in the solution, the user equipment does not need to always read, when an enabling status of the access control function changes, the SIB 1 to obtain the updated scheduling parameter corresponding to the access control parameter, so as to reduce the power consumption.

In addition, on the basis of the foregoing solution, another implementation is provided.

When the UE reads a system message, the UE first reads a value tag and an access control enabling indication in a MIB. If the access control enabling indication indicates that an access control function is enabled, the UE detects whether a SIB 1 that includes scheduling information of an access control parameter is stored. If the UE does not locally store the scheduling information of the access control parameter, the UE reads the SIB 1 to obtain the scheduling information of the access control parameter, and then obtains a SIB_AC in which the access control parameter is located and that is at a resource location indicated in the scheduling information. If the UE stores the scheduling information, the UE compares a current value tag with a previously stored value tag. If values of the value tags are the same, the UE uses previously stored scheduling information corresponding to the access control parameter to read a SIB_AC in which the access parameter is located without reading the SIB 1 in which the access control parameter is located. If values of the value tags are different, the UE reads scheduling information that is of the access control parameter and that is updated in the SIB 1, and then updates the scheduling information to the updated scheduling information, and reads the SIB_AC in which the access control parameter is located.

When the UE reads the system message, the UE first reads the value tag and the access control enabling indication in the MIB. If the access control enabling indication indicates that the access control function is disabled, the UE stores the scheduling information of the access control parameter in the SIB 1.

Different from the foregoing solution, if the SIB 1 changes for another reason, the UE may re-read the SIB 1 according to the value tag. However, if a new SIB 1 does not include the scheduling information of the SIB_AC, it is considered that the original scheduling information of the SIB_AC is still retained. That is, when the new SIB 1 does not include the scheduling information of the access control parameter, the locally stored scheduling information is still used to read the access control parameter at a corresponding location.

Optionally, there is another possible processing method. When the UE detects that the scheduling information of the SIB_AC is not locally stored, the UE reads the SIB 1 to obtain the scheduling information of the SIB_AC later for storage. In this case, regardless of whether the access control function is activated, the UE may read the scheduling information that is of the SIB_AC and that is in the SIB 1 for storage, so that in a subsequent process, if it is determined that the scheduling information does not change, the UE may directly use the locally stored scheduling information without reading the SIB 1 again, so as to save energy.

Figure 7:
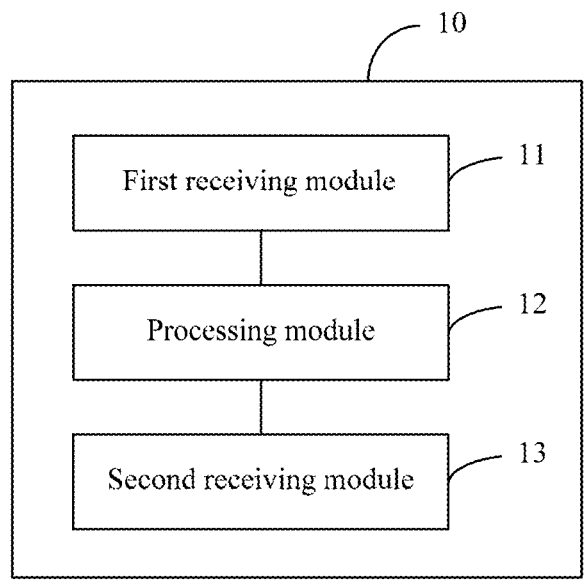
FIG. 7 is a schematic structural diagram of Embodiment 1 of an activation system information transmission apparatus according to the present invention.

FIG. 7 is a schematic structural diagram of Embodiment 1 of an activation system information transmission apparatus according to the present invention. As shown in FIG. 7, the activation system information transmission apparatus 10 includes:

a first receiving module 11, configured to receive a first system message sent by a base station, where the first system message includes activation indication information and a change indication tag, the activation indication information is used to indicate whether a function indicated in an activation system message is activated, and the change indication tag is used to indicate whether scheduling information of the activation system message changes;

a processing module 12, configured to obtain first scheduling information of the activation system message according to the activation indication information and the change indication tag; and a second receiving module 13, configured to read the activation system message according to the first scheduling information.

The activation system information transmission apparatus provided in this embodiment is configured to perform the technical solution in the method embodiment shown in FIG. 3 or FIG. 4. An implementation principle and a technical effect of the apparatus are similar to those of the method embodiment shown in FIG. 3 or FIG. 4. The apparatus receives the activation indication information and the change indication tag that are added by the base station to the broadcast first system message; and after receiving the first system message, the apparatus selects, according to the activation indication information and the change indication tag, different manners to obtain the first scheduling information of the activation system message, and then reads the activation system message at a location corresponding to the first scheduling information, so as to ensure that the transmission apparatus needs to receive the scheduling information of the activation system message only when the scheduling information changes, and prevent the transmission apparatus from continuously remaining in a detection and reception state, thereby effectively reducing power consumption.

Figure 8:
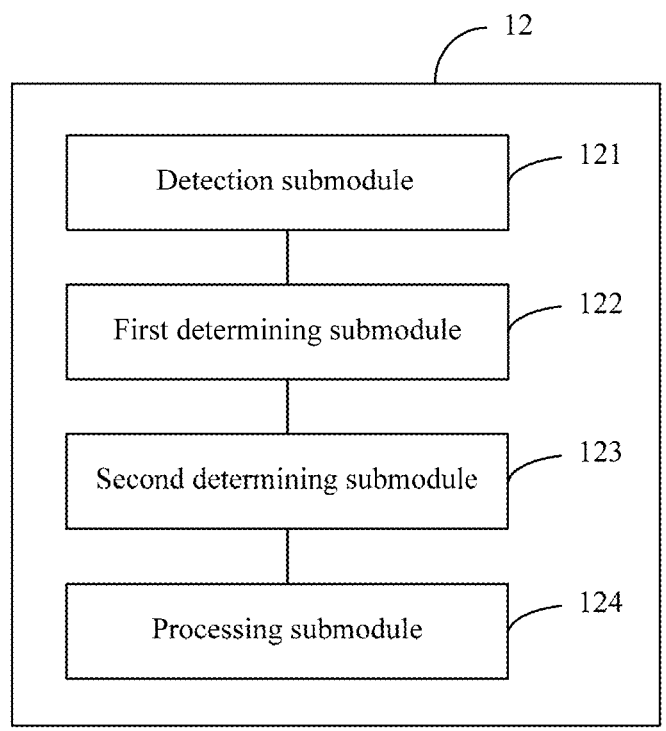
FIG. 8 is a schematic structural diagram of Embodiment 2 of an activation system information transmission apparatus according to the present invention.

FIG. 8 is a schematic structural diagram of Embodiment 2 of an activation system information transmission apparatus according to the present invention. As shown in FIG. 8, on the basis of the foregoing embodiment, the processing module 12 includes:

a detection submodule 121, configured to detect whether the scheduling information of the activation system message is locally stored;

a first determining submodule 122, configured to: if the detection submodule detects that the scheduling information of the activation system message is locally stored, determine, according to the activation indication information, whether the function indicated in the activation system message is activated;

a second determining submodule 123, configured to: if the first determining submodule determines that the function indicated in the activation system message is activated, determine, according to the change indication tag, whether the scheduling information of the activation system message changes; and a processing submodule 124, configured to: if the second determining submodule determines that the scheduling information of the activation system message does not change, use the locally stored scheduling information of the activation system message as the first scheduling information.

Optionally, if the detection submodule 121 detects that the scheduling information of the activation system message is not locally stored, the second receiving module 13 is further configured to receive a second system message sent by the base station, where the second system message includes the first scheduling information of the activation system message and scheduling information of a conventional system message.

Optionally, if the detection submodule 121 detects that the scheduling information of the activation system message is not locally stored, and the first determining submodule 122 determines that the function indicated in the activation system message is activated, the second receiving module 13 is further configured to receive a second system message sent by the base station, where the second system message includes the first scheduling information of the activation system message and scheduling information of a conventional system message.

Optionally, if the second determining submodule 123 determines that the scheduling information of the activation system message changes, the second receiving module 13 is further configured to receive a second system message sent by the base station, where the second system message includes the first scheduling information of the activation system message and scheduling information of a conventional system message.

Figure 9:
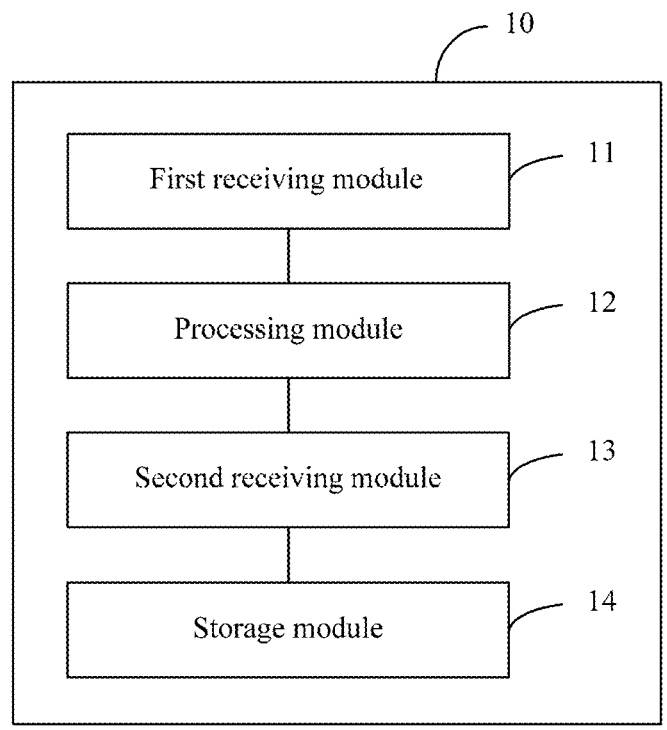
FIG. 9 is a schematic structural diagram of Embodiment 3 of an activation system information transmission apparatus according to the present invention.

FIG. 9 is a schematic structural diagram of Embodiment 3 of an activation system information transmission apparatus according to the present invention. As shown in FIG. 9, on the basis of any one of the foregoing embodiments, the activation system information transmission apparatus 10 further includes:

a storage module 14, configured to update the locally stored scheduling information of the activation system message to the first scheduling information.

Optionally, if the change indication tag is a value tag, the second determining submodule 123 is specifically configured to: if the UE detects that the value tag changes, determine that the scheduling information of the activation system message changes; or if the UE detects that the value tag does not change, determine that the scheduling information of the activation system information does not change.

Further, the activation system message read by the second receiving module 13 includes an access control message.

The activation system information transmission apparatus provided in the embodiment shown in FIG. 8 or FIG. 9 is configured to perform the technical solutions of the UEs in the method embodiments shown in FIG. 2 to FIG. 6. An implementation principle and a technical effect of the apparatus are similar to those of the UEs, and details are not described herein again.

Figure 10:
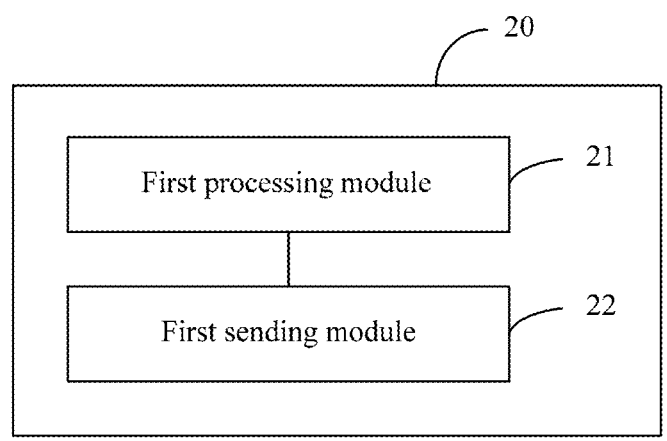
FIG. 10 is a schematic structural diagram of Embodiment 4 of an activation system information transmission apparatus according to the present invention.

FIG. 10 is a schematic structural diagram of Embodiment 4 of an activation system information transmission apparatus according to the present invention. As shown in FIG. 10, the activation system information transmission apparatus 20 includes:

a first processing module 21, configured to generate a first system message, where the first system message includes activation indication information and a change indication tag, the activation indication information is used to indicate whether a function indicated in an activation system message is activated, and the change indication tag is used to indicate whether scheduling information of the activation system message changes; and a first sending module 22, configured to broadcast the first system message, so that user equipment UE obtains first scheduling information of the activation system message according to the activation indication information and the change indication tag, and reads the activation system message according to the first scheduling information.

The activation system information transmission apparatus provided in this embodiment is configured to perform the technical solutions of the base stations in the method embodiments shown in FIG. 2 to FIG. 6. An implementation principle and a technical effect of the apparatus are similar to those of the base stations, and details are not described herein again.

Figure 11:
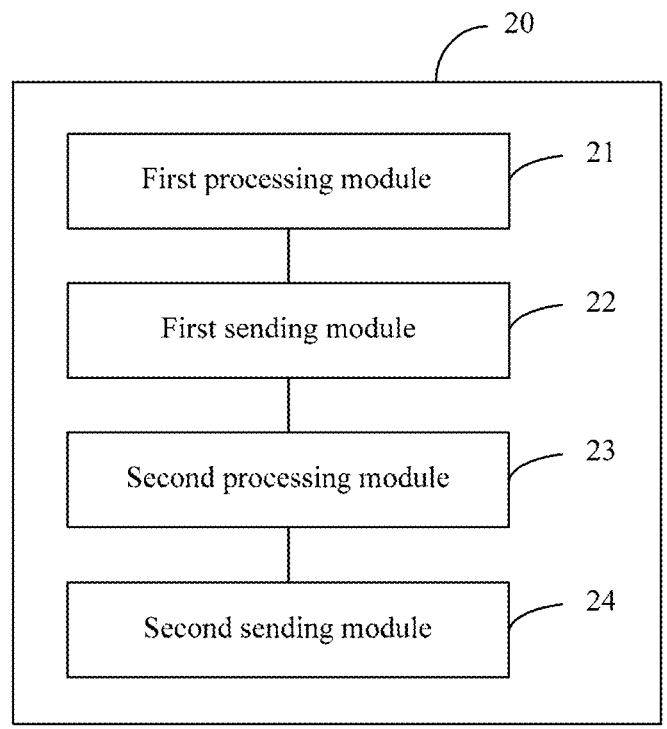
FIG. 11 is a schematic structural diagram of Embodiment 5 of an activation system information transmission apparatus according to the present invention.

FIG. 11 is a schematic structural diagram of Embodiment 5 of an activation system information transmission apparatus according to the present invention. As shown in FIG. 11, the activation system information transmission apparatus 20 further includes:

a second processing module 23, configured to generate a second system message, where the second system message includes the scheduling information corresponding to the activation system message and scheduling information of a conventional system message; and a second sending module 24, configured to broadcast the second system message and the activation system message if the activation indication information indicates that the function indicated in the activation system message is activated, where the second sending module is further configured to broadcast the second system message if the activation indication information indicates that the function indicated in the activation system message is not activated.

Optionally, if the change indication tag is a value tag, the first processing module 21 is specifically configured to:

change the value tag when it is determined that the sent scheduling information of the activation system message changes; or change the value tag when it is determined that the access control apparatus changes from a state in which the access control apparatus does not send the scheduling information of the activation system message to a state in which the access control apparatus sends the scheduling information of the activation system information, or the access control apparatus changes from a state in which the access control apparatus sends the scheduling information of the activation system message to a state in which the access control apparatus does not send the scheduling information of the activation system information; or skip changing the value tag when it is determined that the access control apparatus changes from a state in which the access control apparatus does not send the scheduling information of the activation system message to a state in which the access control apparatus sends the scheduling information of the activation system information, or the access control apparatus changes from a state in which the access control apparatus sends the scheduling information of the activation system message to a state in which the access control apparatus does not send the scheduling information of the activation system information.

The activation system information transmission apparatus provided in this embodiment is configured to perform the technical solutions of the base stations in the method embodiments shown in FIG. 2 to FIG. 6. An implementation principle and a technical effect of the apparatus are similar to those of the base stations, and details are not described herein again.

Figure 12:
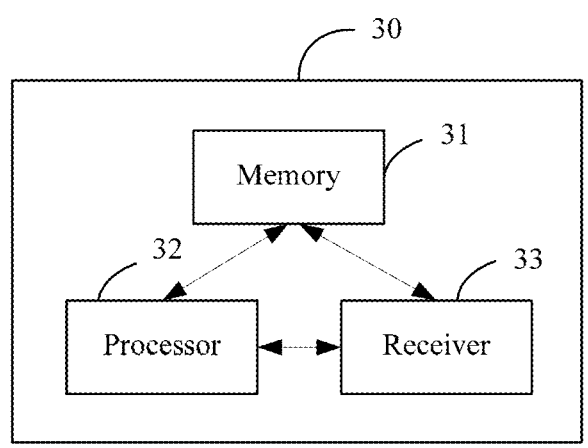
FIG. 12 is a schematic structural diagram of Embodiment 1 of user equipment according to the present invention.

FIG. 12 is a schematic structural diagram of Embodiment 1 of user equipment according to the present invention. As shown in FIG. 12, the user equipment 30 includes a memory 31 that stores a program instruction, a processor 32 configured to control execution of the program instruction, and a receiver 33.

The receiver 33 is configured to receive a first system message sent by a base station, where the first system message includes activation indication information and a change indication tag, the activation indication information is used to indicate whether a function indicated in an activation system message is activated, and the change indication tag is used to indicate whether scheduling information of the activation system message changes.

The processor 32 is configured to obtain first scheduling information of the activation system message according to the activation indication information and the change indication tag.

The receiver 33 is further configured to read the activation system message according to the first scheduling information.

Specifically, the processor 32 of the user equipment 30 is specifically configured to:

detect whether the scheduling information of the activation system message is locally stored;

if the scheduling information of the activation system message is locally stored, determine, according to the activation indication information, whether the function indicated in the activation system message is activated;

if the function indicated in the activation system message is activated, determine, according to the change indication tag, whether the scheduling information of the activation system message changes; and if the scheduling information of the activation system message does not change, use the locally stored scheduling information of the activation system message as the first scheduling information.

Optionally, if the scheduling information of the activation system message is not locally stored, the receiver 33 is further configured to receive a second system message sent by the base station, where the second system message includes the first scheduling information of the activation system message and scheduling information of a conventional system message.

Optionally, if the scheduling information of the activation system message is not locally stored, and the function indicated in the activation system message is activated, the receiver 33 is further configured to receive a second system message sent by the base station, where the second system message includes the first scheduling information of the activation system message and scheduling information of a conventional system message.

Optionally, if the scheduling information of the activation system message changes, the receiver 33 is further configured to receive a second system message sent by the base station, where the second system message includes the first scheduling information of the activation system message and scheduling information of a conventional system message.

Further, the processor 32 is configured to update the scheduling information that is of the activation system message and that is stored in the memory 31 to the first scheduling information.

Optionally, if the change indication tag is a value tag, the processor 32 is further configured to:

if it is detected that the value tag changes, determine that the scheduling information of the activation system message changes; or if it is detected that the value tag does not change, determine that the scheduling information of the activation system information does not change.

Optionally, the activation system message includes an access control message.

The user equipment provided in this embodiment is configured to perform the technical solutions of the UEs in the method embodiments shown in FIG. 2 to FIG. 6. An implementation principle and a technical effect of the user equipment are similar to those of the UEs, and details are not described herein again.

Figure 13:
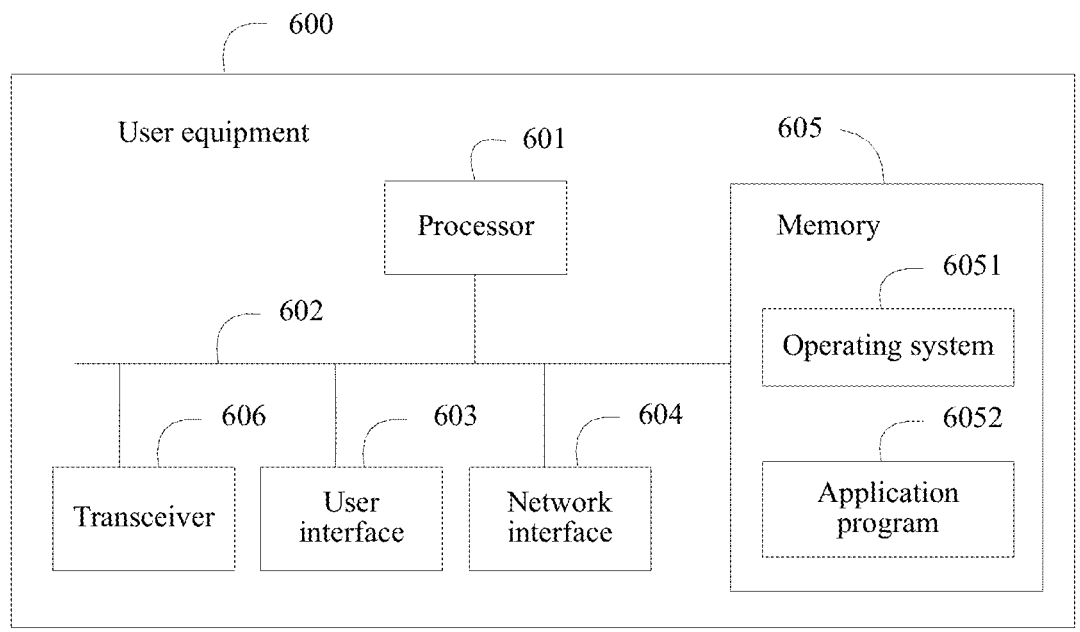
FIG. 13 is a schematic structural diagram of Embodiment 2 of user equipment according to the present invention.

FIG. 13 is a schematic structural diagram of Embodiment 2 of user equipment according to the present invention. As shown in FIG. 13, the user equipment 600 includes at least one processor 601, at least one network interface 604 or another user interface 603, a memory 605, at least one communications bus 602, and a transceiver 606. The communications bus 602 is configured to implement connection and communication between these components. Optionally, the terminal device 600 includes the user interface 603. The user interface 603 includes a display (such as a touchscreen, an LCD, a CRT, a holographic imaging device, or a projector), a keyboard, or a click device (such as a mouse, a trackball, a touchpad, or a touchscreen).

The memory 605 may include a read-only memory and a random access memory, and provide an instruction and data for the processor 601. A part of the memory 605 may be specifically implemented as: a read-only memory (ROM), a RAM, a flash memory, a hard disk, a solid state disk, a magnetic tape, a floppy disk, an optical disc, and any combination thereof.

In this solution, the transceiver 606 may specifically include a transmitter circuit and a receiver circuit, and a carrier thereof, so as to allow data transmission and reception between the user equipment 600 and a base station or a wireless network router. The transmitter circuit and the receiver circuit may be coupled to an antenna for implementation.

Figure 1:
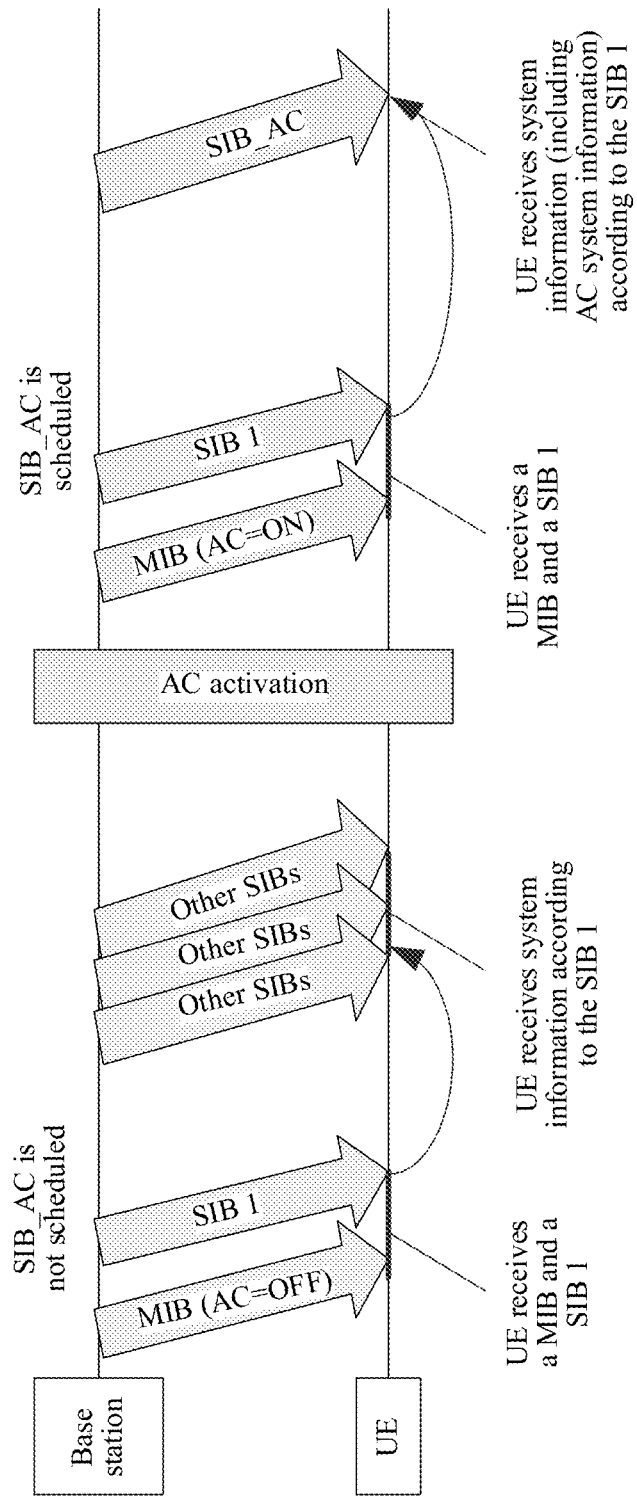
FIG. 1 is a schematic diagram of NB-IoT access control.

In some implementations, the memory 605 stores the following elements: an executable module or a data structure, or a subset thereof, or an extended set thereof: an operating system 6051, including various system programs, such as a framework layer, a kernel library layer, and a driver layer, and configured to implement various basic services and process a hardware-based task; and an application program module 6052, including various application programs, such as a desktop (launcher), a media player, and a browser that are shown in FIG. 1, and configured to implement various application services.

In this embodiment of the present invention, the processor 601 is configured to control execution of the solution of the UE in the method embodiment by invoking a program or an instruction stored in the memory 605. Specifically, the processor 601 is configured to control the transceiver 606 to receive a first system message sent by the base station, where the first system message includes activation indication information and a change indication tag, the activation indication information is used to indicate whether a function indicated in an activation system message is activated, and the change indication tag is used to indicate whether scheduling information of the activation system message changes.

The processor 601 is further configured to control execution of the instruction in the memory 605 to: obtain first scheduling information of the activation system message according to the activation indication information and the change indication tag, and read the activation system message according to the first scheduling information.

Figure 14:
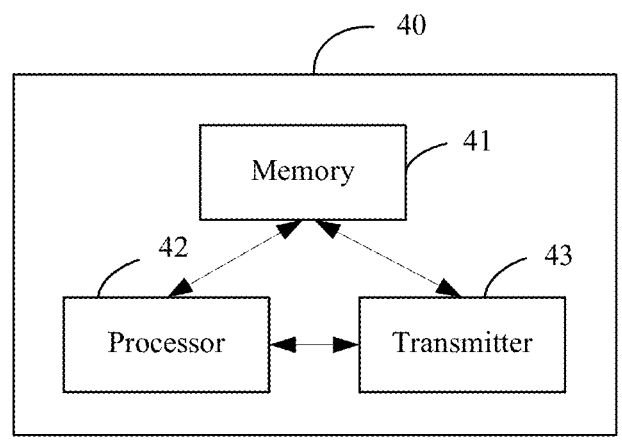
FIG. 14 is a schematic structural diagram of Embodiment 1 of a base station according to the present invention.

FIG. 14 is a schematic structural diagram of Embodiment 1 of a base station according to the present invention. As shown in FIG. 14, the base station 40 includes a memory 41 that stores a program instruction, a processor 42 configured to control execution of the program instruction, and a transmitter 43.

The processor 42 is configured to generate a first system message, where the first system message includes activation indication information and a change indication tag, the activation indication information is used to indicate whether a function indicated in an activation system message is activated, and the change indication tag is used to indicate whether scheduling information of the activation system message changes.

The transmitter 43 is configured to broadcast the first system message, so that user equipment UE obtains first scheduling information of the activation system message according to the activation indication information and the change indication tag, and reads the activation system message according to the first scheduling information.

Optionally, the processor 42 is further configured to generate a second system message, where the second system message includes the scheduling information corresponding to the activation system message and scheduling information of a conventional system message.

The transmitter 43 is further configured to broadcast the second system message and the activation system message if the activation indication information indicates that the function indicated in the activation system message is activated; or the transmitter 43 is further configured to broadcast the second system message if the activation indication information indicates that the function indicated in the activation system message is not activated.

Optionally, the change indication tag is a value tag. The processor 42 is specifically configured to:

change the value tag when it is determined that the sent scheduling information of the activation system message changes; or change the value tag when it is determined that the base station changes from a state in which the base station does not send the scheduling information of the activation system message to a state in which the base station sends the scheduling information of the activation system information, or the base station changes from a state in which the base station sends the scheduling information of the activation system message to a state in which the base station does not send the scheduling information of the activation system information; or skip changing the value tag when it is determined that the base station changes from a state in which the base station does not send the scheduling information of the activation system message to a state in which the base station sends the scheduling information of the activation system information, or the base station changes from a state in which the base station sends the scheduling information of the activation system message to a state in which the base station does not send the scheduling information of the activation system information.

The activation system message includes an access control message.

The base station provided in this embodiment is configured to perform the technical solutions of the base stations in the method embodiments shown in FIG. 2 to FIG. 6. An implementation principle and a technical effect of the base station are similar to those of the base stations, and details are not described herein again.

In the foregoing embodiment of the user equipment or the base station, it should be understood that the processor may be a central processing unit (CPU), or may be another general-purpose processor, a digital signal processor (DSP), an application-specific integrated circuit (ASIC ort), or the like. The general-purpose processor may be a microprocessor, or the processor may be any conventional processor or the like. The steps in the method disclosed with reference to the embodiments of the present invention may be directly performed by a hardware processor, or may be performed by using a combination of hardware in a processor and a software module.

Persons of ordinary skill in the art may understand that all or some of the steps of the method embodiments may be implemented by a program instructing relevant hardware. The program may be stored in a computer-readable storage medium. When the program is executed, the steps of the methods in the embodiments are performed. The storage medium includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. An activation system information transmission method, comprising:
    receiving, by user equipment (UE), a first system message from a base station, wherein the first system message comprises activation indication information and a change indication tag, the activation indication information indicates whether a function indicated in an activation system message is activated, and the change indication tag is a value tag;
    detecting, by the UE, whether the scheduling information of the activation system message is locally stored;
    determining, by the UE according to the activation indication information, whether the function indicated in the activation system message is activated in response to the scheduling information of the activation system message being locally stored;
    determining, by the UE according to the value tag, that the scheduling information of the activation system message does not change in response to the function indicated in the activation system message being activated;
    using, by the UE, the locally stored scheduling information of the activation system message as first scheduling information in response to the scheduling information of the activation system message not changing; and
    reading, by the UE, the activation system message according to the first scheduling information.

2. The method according to claim 1, wherein the reading, by the UE, the activation system message according to the first scheduling information comprises:
    obtaining, by the UE, an updated system message according to the first scheduling information.

3. The method according to claim 1, wherein the change indication tag further indicates a change of a second system message, wherein the second system message comprises the scheduling information of the activation system message.

4. The method according to claim 1, wherein the change indication tag in the first system message does not indicate a change of the activation system message.

5. The method according to claim 1, wherein the method further comprises:
    if the scheduling information of the activation system message is not locally stored, receiving, by the UE, a second system message sent by the base station, wherein the second system message comprises the first scheduling information of the activation system message and scheduling information of a non-activation system message.

6. The method according to claim 5, wherein the method further comprises:
    updating, by the UE, the locally stored scheduling information of the activation system message to the first scheduling information.

7. The method according to claim 1, wherein the method further comprises:
    if the scheduling information of the activation system message is not locally stored, and the function indicated in the activation system message is activated, receiving, by the UE, a second system message sent by the base station, wherein the second system message comprises the first scheduling information of the activation system message and scheduling information of a conventional system message.

8. The method according to claim 1, wherein the method further comprises:
    if the scheduling information of the activation system message changes, receiving, by the UE, a second system message sent by the base station, wherein the second system message comprises the first scheduling information of the activation system message and scheduling information of a conventional system message.

9. The method according to claim 1, wherein the determining, by the UE according to the value tag, that the scheduling information of the activation system message does not change comprises:
    if the UE detects that the value tag does not change, determining that the scheduling information of the activation system message does not change.

10. The method according to claim 1, wherein the activation system message comprises access control information.

11. The method according to claim 10, further including:
    determining, by the UE, according to the access control message, whether to access a network.

12. An apparatus, comprising a memory that stores a program instruction, a processor configured to control execution of the program instruction, and a receiver, wherein:
    the receiver is configured to receive a first system message sent by a base station, wherein the first system message comprises activation indication information and a change indication tag, the activation indication information indicates whether a function indicated in an activation system message is activated, and the change indication tag is a value tag;

the processor is configured to
detect, whether the scheduling information of the activation system message is locally stored;
determine, according to the activation indication information, whether the function indicated in the activation system message is activated in response to the scheduling information of the activation system message being locally stored;
determine, according to the value tag, that the scheduling information of the activation system message does not change in response to the function indicated in the activation system message being activated;
use the locally stored scheduling information of the activation system message as first scheduling information in response to the scheduling information of the activation system message not changing; and
the receiver is further configured to read the activation system message according to the first scheduling information.

13. The apparatus according to claim 12, wherein
the processor is configured to obtain an updated system message according to the first scheduling information.

14. The apparatus according to claim 12, wherein
the change indication tag further indicates a change of a second system message, wherein the second system message comprises the scheduling information of the activation system message.

15. The apparatus according to claim 12, wherein
the change indication tag in the first system message does not indicate a change of the activation system message.

16. The apparatus according to claim 12, wherein if the scheduling information of the activation system message is not locally stored, the receiver is further configured to receive a second system message sent by the base station, wherein the second system message comprises the first scheduling information of the activation system message and scheduling information of a conventional system message.

17. The apparatus according to claim 12, wherein the activation system message read by the receiver comprises access control information.

18. The apparatus according to claim 12, wherein in determining that the scheduling information of the activation system message does not change, the processor is configured to detect that the value tag does not change, and determine that the scheduling information of the activation system message does not change.

19. The apparatus according to claim 12, wherein the apparatus is user equipment.

20. The computer program product according to claim 12, wherein in determining that the scheduling information of the activation system message does not change, the computer program product cause the computer to detect that the value tag does not change, and determine that the scheduling information of the activation system message does not change.

21. A computer program product stored in a non-transitory medium, comprising instructions which, when executed by a computer, cause the computer to:
receive a first system message sent by a base station, wherein the first system message comprises activation indication information and a change indication tag, the activation indication information indicates whether a function indicated in an activation system message is activated, and the change indication tag is a value tag;
detect whether the scheduling information of the activation system message is locally stored;
determine, according to the activation indication information, whether the function indicated in the activation system message is activated in response to the scheduling information of the activation system message being locally stored;
determine, according to the value tag, that the scheduling information of the activation system message does not change in response to the function indicated in the activation system message being activated;
use, the locally stored scheduling information of the activation system message as first scheduling information in response to the scheduling information of the activation system message not changing; and
read the activation system message according to the first scheduling information.

* * * * *